Aug. 4, 1931.  E. S. PURINGTON  1,817,763
MOBILE TORQUE DEVICE
Filed March 7, 1930
Fig. 1.
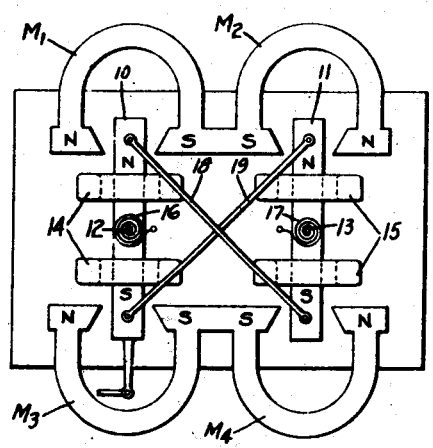
Fig. 2.
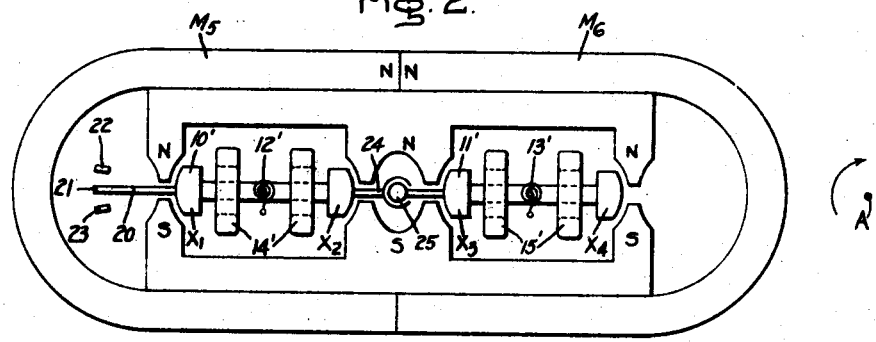
Fig. 3.
Inventor:
Ellison S. Purington,
by Charles E. Mullen
His Attorney.

Patented Aug. 4, 1931

1,817,763

UNITED STATES PATENT OFFICE

ELLISON S. PURINGTON, OF GLOUCESTER, MASSACHUSETTS, ASSIGNOR TO GENERAL ELECTRIC COMPANY, A CORPORATION OF NEW YORK

MOBILE TORQUE DEVICE

Application filed March 7, 1930. Serial No. 434,063.

My invention relates to torque producing devices, particularly electroresponsive devices of the balanced armature type and has for its principal object to avoid the effect of extraneous rotary movement on such devices.

Where an electroresponsive torque device of the balanced type is subjected to extraneous rotary motion, a false operation of the device may result. Thus for example with a circuit controlling relay having a balanced armature provided with controlling windings for operation between opposing electromagnetic poles mounted in and used for the control of an airplane, a torpedo or other mobile device and thereby subjected to extraneous rotary movement, the balanced armature due to its inertia effect may cause an operation of the contact entirely independent of the energization of the controlling windings.

In accordance with the present invention, this difficulty is avoided by subdividing the balanced rotary armature of the electroresponsive torque producing device into two parts which are independently mounted for rotary movement and mechanically connected together so that the inertia effect of one part compensates for the inertia effect of the other part upon an extraneous rotary movement of the device as a whole.

The invention may be more fully understood from the accompanying drawings in which Fig. 1 shows schematically one form of electroresponsive torque producing device having two separately pivoted armatures mechanically interconnected to compensate for the effect of extraneous movement; and Figs. 2 and 3 show modified arrangements.

In Fig. 1, the armatures 10 and 11 are pivoted respectively at the points 12, 13 for rotation about their respective centers of gravity with the ends of the armatures extending between the magnetic poles indicated as N and S in the drawings. These poles are provided by magnetic field forming means which may be either the permanent magnets $M_1$, $M_2$, $M_3$ and $M_4$ as shown or a suitable electromagnet. The operation of the balanced pivoted armatures 10 and 11 is controlled by the operating windings 14 and 15. These windings are connected so as to produce rotation of the balanced armature 10 in an opposite direction to that of the balanced armature 11. If desired, the torsion springs 16 and 17 may be provided for maintaining the armatures 10 and 11 respectively in the mid-position between the poles N and S, as indicated in Fig. 1.

In order to eliminate the disturbing effect of extraneous rotary movement on the balanced armatures 10 and 11, these armatures are mechanically interconnected by means of the rods 18 and 19 so that when the upper end of the armature 10 moves to the left the lower end of the armature 11 will also move to the left, and vice versa. In this way assuming the entire electroresponsive device to be subjected to an extraneous rotary movement, the inertia effect of the armature 10 will compensate for that of the armature 11 and thereby avoid false operation of the armature independently of the controlling windings 14 and 15.

The dynamic requirements for the movable members of a device of this type are as follows:

1. Each armature member is supported at its center of gravity so as to compensate for translational shocks.

2. From a commercial viewpoint, the armature members have the same shape and dimensions, and the same moment of inertia about the center of gravity.

3. The coupling between the two armature members of equal moments of inertia is such as to produce equal torques upon the two members, with equal but opposite forces upon the coupling device.

4. The electrical circuits are such as to produce torques in opposite senses of the two members, and therefore forces in the same sense on the coupling device.

These requirements are also met by the modified arrangement shown in Fig. 2 in which the armatures 10' and 11' are mounted for independent rotary movement upon the points 12' and 13' in the magnetic field set up by the permanent magnets $M_5$ and $M_6$ which act jointly upon the pole pieces indicated as N and S. The rotary movement of the armatures 10' and 11' is controlled by the energization of the windings 14' and 15'. In this case the connection arrangement of the windings 14' and 15' also is such that the armatures 10' and 11' are operated in opposite directions. That is, when the armature 10' is operated in the clockwise direction under the control of the winding 14', the armature 11' is operated in the counterclockwise direction under the control of the winding 15'.

The armature 10' is provided with an arm 20 carrying on its extremity the contact 21 which is operable between the two spaced-apart stationary contacts 22 and 23.

In accordance with the present invention, the armatures 10' and 11' are mechanically interconnected so as to avoid the deleterious effect of extraneous rotary movement of the device as a whole. This is accomplished, as shown in Fig. 2, by providing a yoke-shaped member 24 on the end of the armature 10' opposite that carrying the contact 21 and providing a cooperating member 25 on the end of the armature 11' which is received in sliding engagement between the opposing arms of the yoke-shaped member 24. In this way when the controlling windings 14' and 15' are energized, the armatures 10' and 11' cooperate to move the contact 21 into engagement with either of the stationary contacts 22 and 23. However when the device is subjected to extraneous rotary movement, the inertia effect of the armature 10' compensates that of the armature 11' and prevents false operation of the contact 21.

Thus, in Fig. 2, assume the masses $X_1$ $X_2$ $X_3$ $X_4$ are concentrated at the ends of the pivoted armature members of 1 gram value and assume each armature member is 2 cm. in length and of a total mass of two grams, assume angular acceleration of all parts of the system amounting to 1 radian per second per second, about an axis A 5 cm. removed from $X_4$ and in line with $X_1$ $X_2$ and $X_3$.

For the system to be entirely rigid the linear acceleration of masses $X_1$ to $X_4$ must be 9, 7, 7, and 5 cm. per second, and therefore the forces necessary to cause the acceleration are 9, 7, 7, and 5 dynes. With the pivot and constraining device operative, the forces for $X_1$ and $X_2$ to produce the required acceleration are obtained by 16 dynes applied to the entire member by the pivot, in combination with a torque of 2 dyne cm. These torques are in the same direction in an angular sense, but are produced by equal and opposite forces of two dynes exerted by the coupling device. On account of the equality of the forces, no motion is produced in the coupling device itself, although free to move. As a result, the entire system behaves as a rigid body, and the forces required to cause every part of the movable system to move together are supplied by the pivots and by the torques resulting from equal and opposite reactions of the coupling device.

A generalized study would show that complete compensation exists under all conditions. Thus if a rigid body is put into any type of motion, the motion of any selected group of particles at any time may be described by translational motion of the center of gravity in combination with a rotary motion of the particles about the center of gravity. Considering two groups of particles, the translational velocities of their centers of gravity will in general be different, but the angular velocities about their respective centers of gravity are the same. For this reason in relays of this type, although the pivot forces may be unequal because of the difference of the translational accelerations of the centers of gravity, the torques are equal since there is no such difference of angular accelerations.

In the modification shown in Fig. 3, a simplified construction is employed which avoids the necessity for polarizing magnets. In this arrangement the magnetic frame 26 is formed to include the pole pieces 27 and 28 for the controlling windings 14" and 15" between the cooperating poles indicated as SS and NN. The armatures 10" and 11" are pivotally supported at the points 12" and 13" in attractive relation with the poles. The counterweights 29 and 30 are provided for balancing the armatures. The two armatures are mechanically interconnected so as to impose a restraint thereon which compels them to turn with respect to each other in a predetermined manner. This is accomplished by means of the member 31 which is provided with recesses into which the adjacent ends of the armatures loosely fit. The member 31 may be supported independently of the armatures as by means of a spring or the like and carries the contact 32 in cooperating relation with the contact 33.

From the above analysis it will be seen that the mechanical restraint imposed upon the balanced armatures 10" and 11", to enforce rotation thereof in opposite directions, makes the entire mechanism rigid against rotational shocks. Due to the balanced mounting of the armatures they also are rigid against transitional shocks. Thus movement of the armatures results only from energization of the two operating windings 14" and 15", which may be connected in the series circuit as indicated in the drawings.

While the invention has been described in connection with an electromagnetically operated relay, it is not necessarily limited thereto and may be applied to devices having other motive means for producing the torque.

What I claim as new and desire to secure by Letters Patent of the United States, is:

1. An electrical torque producing device comprising field forming means including magnetic members providing a plurality of spaced-apart poles, a plurality of balanced pivoted armatures mounted for movement in the field set up by said poles, a plurality of windings for effecting rotary movement of said armatures in opposite directions in said field, and means mechanically interconnecting said armatures to compensate the inertia effect thereof upon extraneous rotary movement of the device.

2. An operating mechanism compensated against spurious operation due to rotational and translational shocks, including a plurality of operating members mounted for rotation about their respective centers of gravity in a fixed spatial relation with respect to each other, mechanical connections between said members for enforcing rotation thereof in opposite directions, and motive means for simultaneously effecting rotation of the operating members in opposite direction.

3. An electrical torque producing device including a pair of rotatable members, means for pivotally mounting the members in a fixed spatial relation with respect to each other for rotation about their respective centers of gravity, electrical means for effecting simultaneous rotation of the members in opposite direction, and mechanical means interconnecting the members for enforcing simultaneous rotation thereof in opposite direction independently of said electrical means to compensate for extraneous rotary movement of the device.

4. An electrical torque producing device comprising magnetic field forming means, a pair of armatures pivotally mounted in spaced apart relation for rotation about their respective centers of gravity and arranged to be rotated in opposite directions under the control of said magnetic field forming means, and means mechanically interconnecting said armatures for enforcing rotation thereof in opposite directions independently of said magnetic field forming means to compensate for extraneous rotary movement of the device.

In witness whereof I have hereunto set my hand this 20th day of February 1930.

ELLISON S. PURINGTON.